(12) United States Patent
Wu et al.

(10) Patent No.: US 9,591,273 B1
(45) Date of Patent: Mar. 7, 2017

(54) METHOD AND SYSTEM FOR MONITORING AND VERIFYING A MANUFACTURING PROCESS

(71) Applicant: The Boeing Company, Chicago, IL (US)

(72) Inventors: Vicki Wu, Mercer Island, WA (US); Richard H. Bossi, Renton, WA (US); Marc J. Piehl, Renton, WA (US); Andrej M. Savol, Lake Tapps, WA (US); Farshad Forouhar, Lake Forest Park, WA (US); Pamela J. Manzer, Everett, WA (US)

(73) Assignee: The Boeing Company, Chicago, IL (US)

( * ) Notice: Subject to any disclaimer, the term of this patent is extended or adjusted under 35 U.S.C. 154(b) by 444 days.

(21) Appl. No.: 14/182,263

(22) Filed: Feb. 17, 2014

(51) Int. Cl.
*H04N 7/18* (2006.01)
*G06T 7/00* (2006.01)

(52) U.S. Cl.
CPC ............ *H04N 7/183* (2013.01); *G06T 7/001* (2013.01); *G06T 2207/10016* (2013.01); *G06T 2207/30164* (2013.01); *G06T 2207/30196* (2013.01); *G06T 2207/30232* (2013.01)

(58) Field of Classification Search
CPC ................... G06K 9/6271; H04N 7/18; G06T 2207/10016; G06T 2207/20076; G06T 2207/20081; G06T 2207/30124
See application file for complete search history.

(56) References Cited

U.S. PATENT DOCUMENTS

| 6,064,429 | A | 5/2000 | Belk et al. | |
|---|---|---|---|---|
| 7,349,007 | B2 * | 3/2008 | Millar | G06K 9/00577 348/148 |
| 7,463,714 | B2 | 12/2008 | Edwards et al. | |
| 7,576,850 | B2 | 8/2009 | Engelbart et al. | |
| 8,524,021 | B2 | 9/2013 | Engelbart et al. | |
| 8,528,317 | B2 * | 9/2013 | Gerez | B64D 45/00 244/53 B |
| 8,542,876 | B1 | 9/2013 | Engel et al. | |
| 2012/0310398 | A1 * | 12/2012 | Rataul | G05B 19/41805 700/96 |
| 2014/0247347 | A1 * | 9/2014 | McNeill | H04N 7/18 348/143 |

* cited by examiner

*Primary Examiner* — Nhon Diep (57) ABSTRACT

A method for monitoring and verifying a manufacturing process performed by an operator on a workpiece in a work area. The method includes positioning one or more cameras in the work area, such that the operator and the workpiece are in a field of view of each of the cameras. The method includes using a computer system configured for controlling the cameras to record and process images of the workpiece and images of operator actions relating to the manufacturing process, all recorded by the cameras during or at completion of each of a plurality of tasks in the manufacturing process to obtain recorded images. The method includes storing the recorded images, comparing the recorded images against a reference image library comprising references images corresponding to each recorded image to detect any differences between the recorded image and the respective corresponding reference image, and generating a data record.

24 Claims, 9 Drawing Sheets

METHOD AND SYSTEM FOR MONITORING AND VERIFYING A MANUFACTURING PROCESS

BACKGROUND

The disclosure relates generally to methods and systems for manufacturing process controls, and more particularly, to methods and systems for monitoring and verifying structural bonding process operations.

Composite structures may be used in a wide variety of applications, including in the manufacture of aircraft, spacecraft, rotorcraft, watercraft, automobiles, trucks, and other vehicles and structures, due to their high strength-to-weight ratios, corrosion resistance and other favorable properties. In particular, in aircraft construction, composite structures may be used to form the tail sections, wings, fuselage and other components. Such construction may include composite structures that are bonded together manually (by hand).

Bonding processes have been carefully designed to ensure the quality of the bond, and each step is important to the strength of the bond. Step sequence, timing to complete each step, and timing in between steps are important factors that may affect the overall quality of the bond. In addition, the introduction of foreign object debris (FOD) or other contamination in the bond of composite structures must be controlled to ensure final part structural performance. These issues may be difficult and time consuming to detect, remove, or repair after manufacture of the composite structures. This may result in increased manufacturing time and increased manufacturing costs.

Accordingly, there is a need in the art for an improved method and system for monitoring and verifying manufacturing processes, such as structural bonding processes that provide advantages over known methods and systems.

SUMMARY

This need for an improved method and system for monitoring and verifying manufacturing processes, such as structural bonding processes, that provide advantages over known methods and systems is satisfied. As discussed in the below detailed description, embodiments of the improved method and system for monitoring and verifying manufacturing processes, such as structural bonding processes, may provide significant advantages over known methods and systems.

In an embodiment of the disclosure, there is provided a method for monitoring and verifying a manufacturing process performed by an operator on a workpiece in a work area. The method comprises the step of positioning one or more cameras in the work area, such that the operator and the workpiece are in a field of view of each of the one or more cameras. The method further comprises the step of using a computer system configured for controlling the one or more cameras to record and process images of the workpiece and images of operator actions relating to the manufacturing process, all recorded by the one or more cameras during or at completion of each of a plurality of tasks in the manufacturing process to obtain recorded images. The method further comprises the step of storing the one or more recorded images at selected points in the manufacturing process for subsequent review and verification. The method further comprises the step of comparing one or more of the recorded images against a reference image library comprising one or more reference images corresponding to each recorded image to detect any differences between the recorded image and the respective corresponding reference image. The method further comprises the step of generating a data record of process control data of the manufacturing process performed by the operator on the workpiece in the work area.

In another embodiment of the disclosure, there is provided a method for monitoring and verifying a structural bonding process performed by an operator on a workpiece in a work area. The method comprises the step of positioning one or more vision based cameras in the work area, such that the operator, the work area and the workpiece are in a field of view of each of the one or more vision based cameras. The method further comprises the step of using a computer system configured for controlling the one or more vision based cameras to record and process images of the workpiece, images of operator actions relating to the structural bonding process, and images of the work area, all recorded by the one or more vision based cameras during or at completion of each of a plurality of tasks in the structural bonding process to obtain recorded images. The method further comprises the step of storing the one or more recorded images at selected points in the structural bonding process for subsequent review and verification. The method further comprises the step of comparing one or more of the recorded images against a reference image library comprising one or more reference images corresponding to each recorded image to detect any differences between the recorded image and the respective corresponding reference image. The method further comprises the step of generating a data record of process control data of the structural bonding process performed by the operator on the workpiece in the work area.

In another embodiment of the disclosure, there is provided a system for monitoring and verifying a manufacturing process performed by an operator on a workpiece in a work area. The system comprises one or more vision based cameras positioned in the work area, such that the operator and the workpiece are in a field of view of each of the one or more vision based cameras. The system further comprises a computer system positioned in the work area and configured for controlling the one or more vision based cameras to record and process images of the workpiece and images of operator actions relating to the manufacturing process, all recorded by the one or more vision based cameras during or at completion of each of a plurality of tasks in the manufacturing process to obtain recorded images. The system further comprises a reference image library comprising one or more reference images corresponding to each recorded image to detect any differences between the recorded image and the respective corresponding reference image. The system further comprises a data record of process control data of the manufacturing process performed by the operator on the workpiece in the work area.

The features, functions, and advantages that have been discussed can be achieved independently in various embodiments of the disclosure or may be combined in yet other embodiments, further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein.

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and will fully convey the scope of the disclosure to those skilled in the art.

Figure 1A:
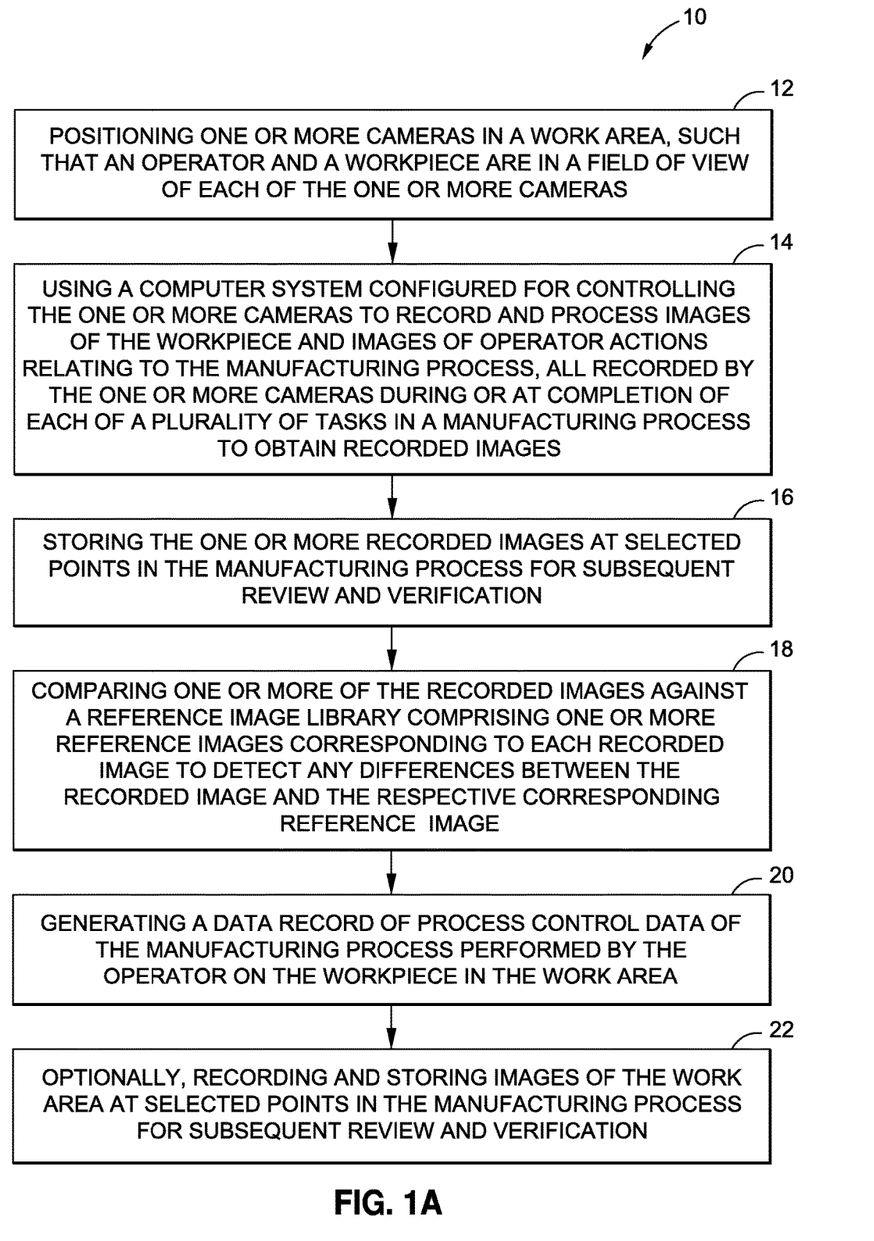
FIG. 1A is an illustration of a flow diagram of an exemplary embodiment of a method of the disclosure.
Figure 1B:
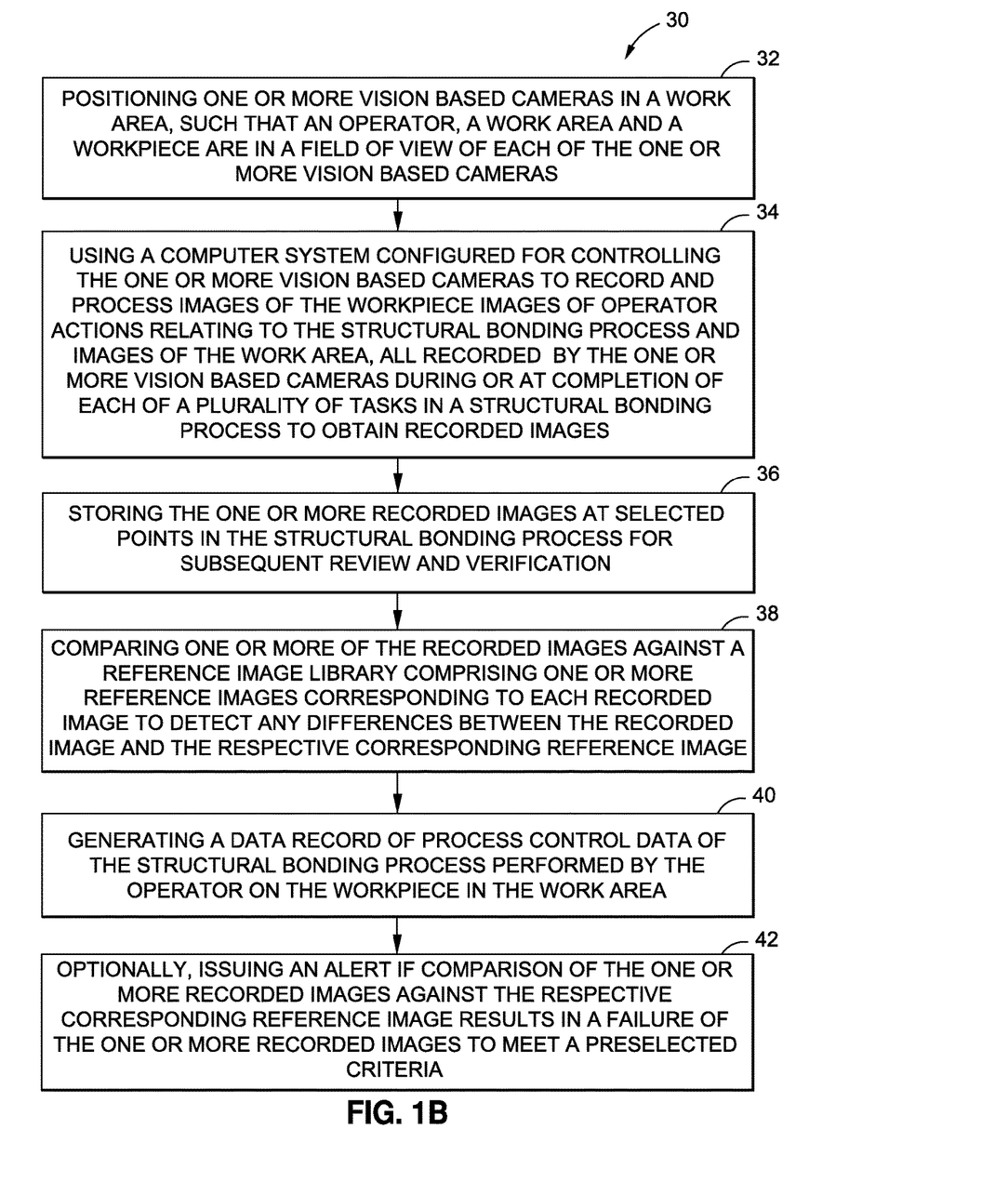
FIG. 1B is an illustration of a flow diagram of another exemplary embodiment of a method of the disclosure.
Figure 2:
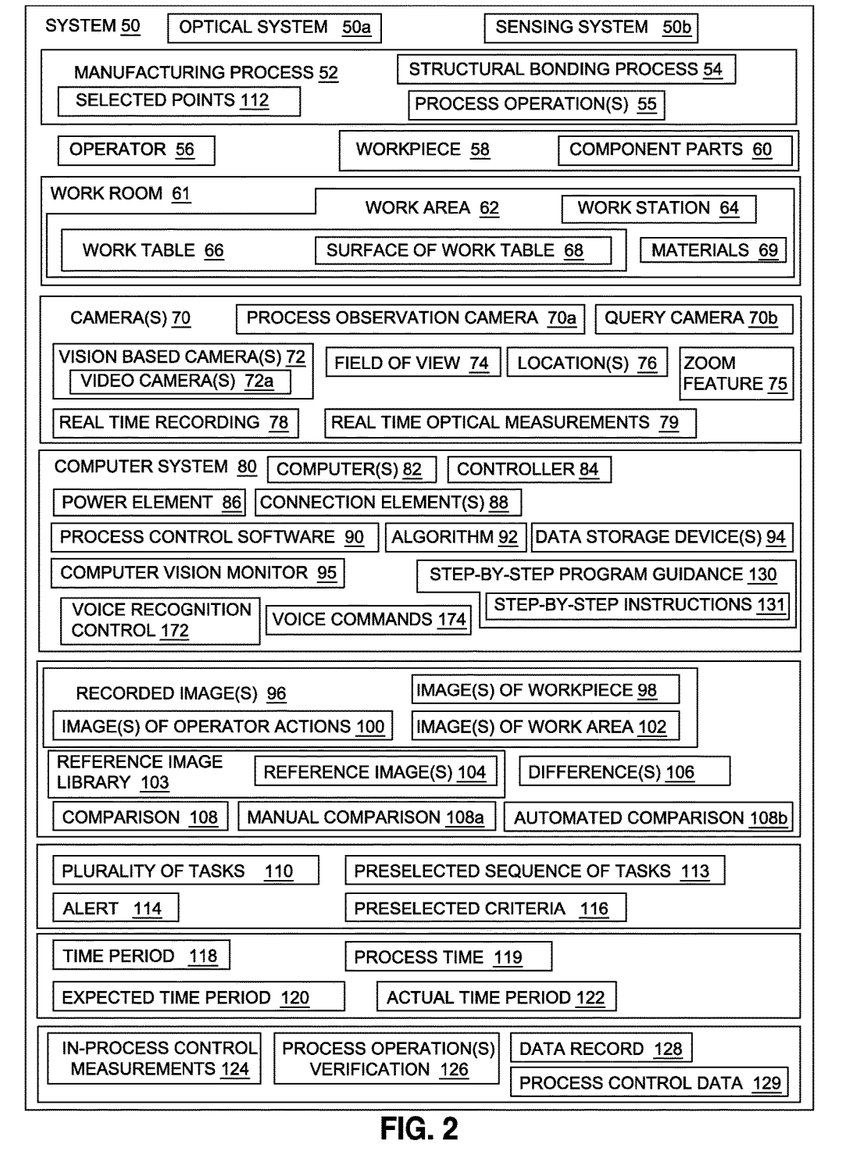
FIG. 2 is an illustration of a block diagram of an exemplary embodiment of a system of the disclosure.

Now referring to the Figures, FIG. 1A is an illustration of a flow diagram of an exemplary embodiment of a method 10 of the disclosure. FIG. 1B is an illustration of a flow diagram of another exemplary embodiment of a method 30 of the disclosure. FIG. 2 is an illustration of a block diagram of an exemplary embodiment of a system 50 of the disclosure.

Figure 3:
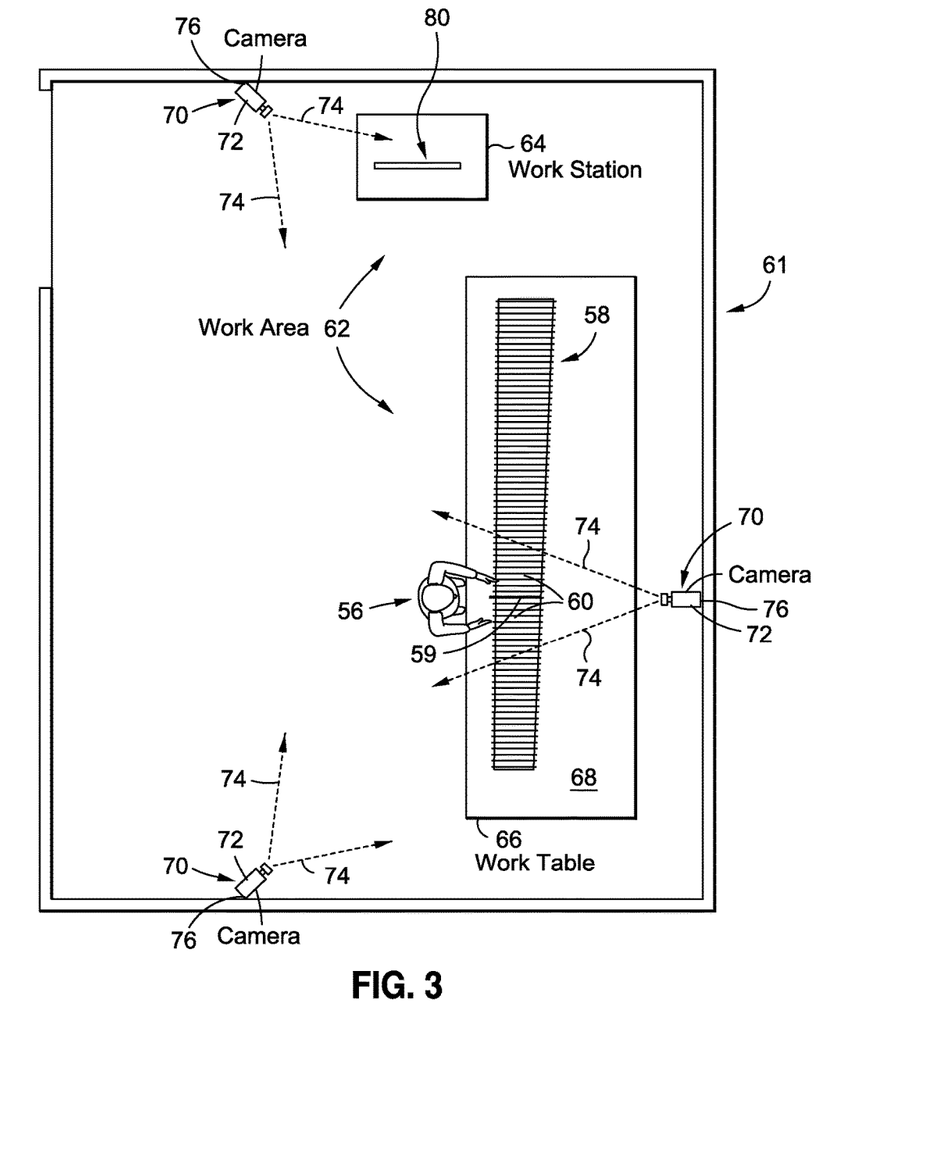
FIG. 3 is an illustration of a work room and an operator using an exemplary embodiment of a system of the disclosure.

As shown in FIG. 1A, there is provided the method 10 for monitoring and verifying a manufacturing process 52 (see FIG. 2) performed by an operator 56 (see FIGS. 2, 3) on a workpiece 58 (see FIGS. 2, 3) in a work area 62 (see FIGS. 2, 3). Preferably, the manufacturing process 52 (see FIG. 2) comprises a structural bonding process 54 (see FIG. 2). However, the manufacturing process 52 may comprise another suitable manufacturing process. Preferably, the manufacturing process 52 is an aerospace or aircraft manufacturing process.

As shown in FIG. 1A, the method 10 comprises step 12 of positioning one or more cameras 70 (see FIGS. 2, 3) in the work area 62 (see FIGS. 2, 3), such that the operator 56 (see FIGS. 2, 3) and the workpiece 58 (see FIGS. 2, 3) are in a field of view 74 (see FIGS. 2, 3) of each of the one or more cameras 70 (see FIGS. 2, 3).

As shown in FIGS. 2 and 3, the workpiece 58 may comprise two or more component parts 60. The workpiece 58 may comprise raw material or partially finished pieces bonded by performing various process operations 55 (see FIG. 2). The workpiece 58 may be comprised of a composite material, a metal material, a combination of a composite material and a metal material, or another suitable material.

Figure 5A:
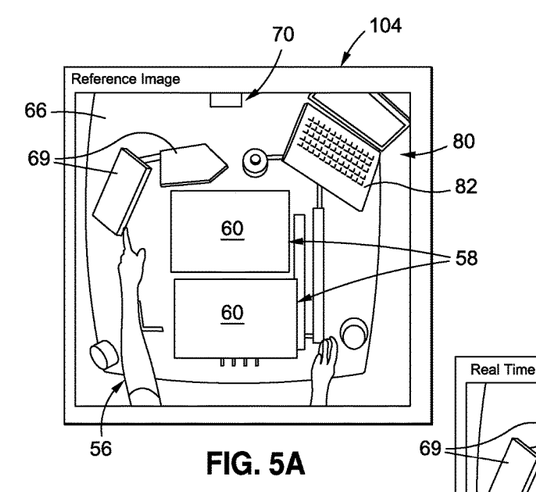
FIG. 5A is an illustration of a reference image used in embodiments of a system and a method of the disclosure.
Figure 5B:
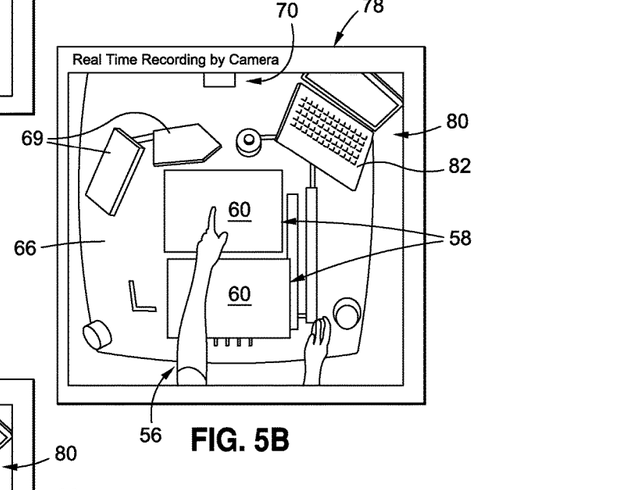
FIG. 5B is an illustration of a real time recording by a camera used in embodiments of a system and a method of the disclosure.
Figure 5C:
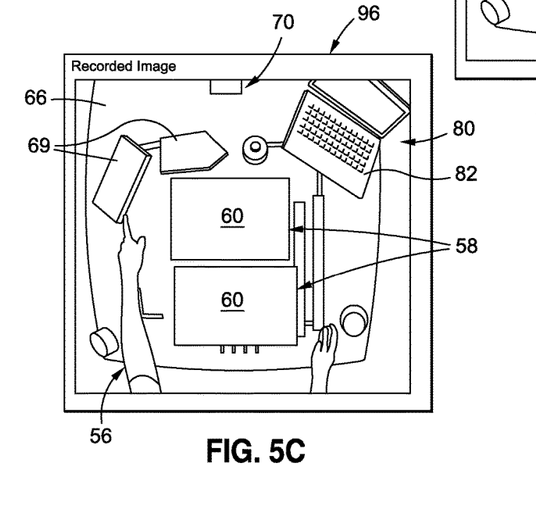
FIG. 5C is an illustration of a recorded image used in embodiments of a system and a method of the disclosure.

As shown in FIG. 1A, the method 10 further comprises step 14 of using a computer system 80 (see FIGS. 2, 3) configured for controlling the one or more cameras 70 (see FIGS. 2, 3) to record and process images of the workpiece 98 (see FIG. 2) and images of operator actions 100 (see FIG. 2) relating to the manufacturing process 52 (see FIG. 2), all recorded by the one or more cameras 70 (see FIGS. 2, 3) during or at completion of each of a plurality of tasks 110 (see FIG. 2) in the manufacturing process 52 (see FIG. 2) to obtain recorded images 96 (see FIGS. 2, 5C). The step 14 (see FIG. 1A) of using the computer system 80 (see FIGS. 2, 3) preferably comprises using the computer system 80 further configured for measuring a time period 118 (see FIG. 2) elapsed during performance of each of the plurality of tasks 110 (see FIG. 2) to compare an actual time period 122 (see FIG. 2) to an expected time period 120 (see FIG. 2) for completion of each of the plurality of tasks 110 (see FIG. 2), and to issue an alert 114 (see FIG. 2) if the actual time period 122 (see FIG. 2) does not substantially conform to the expected time period 120 (see FIG. 2).

The step 14 of using the computer system 80 (see FIGS. 2, 3) may further comprise using the computer system 80 further configured for storing the images of the workpiece 98 (see FIG. 2) upon proper completion of each of the plurality of tasks 110 (see FIG. 2) and for issuing an alert 114 (see FIG. 2) if the images of the workpiece 98 (see FIG. 2) captured by the one or more cameras 70 (see FIG. 2) at completion of each of the plurality of tasks 110 (see FIG. 2) indicates that each of the plurality of tasks 110 (see FIG. 2) was performed outside of a preselected sequence of tasks 113 (see FIG. 2).

The step 14 of using the computer system 80 (see FIGS. 2, 3) may further comprise using a computer system having a voice recognition control 172 (see FIG. 2) to allow the operator 56 (see FIG. 2) to interact with the computer system 80 (see FIG. 2) via one or more voice commands 174 (see FIG. 2).

As shown in FIG. 1A, the method 10 further comprises step 16 of storing the one or more recorded images 96 (see FIG. 2) at selected points 112 (see FIG. 2) in the manufacturing process 52 (see FIG. 2) for subsequent review and verification. Step 16 (see FIG. 1A) comprises storing the one or more recorded images 96 (see FIG. 1A), such as images of the workpiece 98 (see FIG. 2), at selected points 112 (see FIG. 2) in the manufacturing process 52 (see FIG. 2) for subsequent review and verification. Step 16 (see FIG. 1A) further comprises storing the one or more recorded images 96 (see FIG. 1A), such as images of operator actions 100 (see FIG. 2) relating to the manufacturing process 52 (see FIG. 2), at selected points 112 (see FIG. 2) in the manufacturing process 52 (see FIG. 2) for subsequent review and verification.

The operator 56 (see FIG. 2) must record, document and store each recorded image 96 (see FIG. 2) before the operator 56 (see FIG. 2) will be allowed to proceed to the next step of the manufacturing process 52 (see FIG. 2).

As shown in FIG. 1A, the method 10 further comprises step 18 of comparing one or more of the recorded images 96 (see FIG. 2) against a reference image library 103 (see FIG. 2) comprising one or more reference images 104 (see FIG. 2) corresponding to each recorded image 96 (see FIG. 2) to detect any differences 106 (see FIG. 2) between the recorded image 96 (see FIG. 2) and the respective corresponding reference image 104 (see FIG. 2). The reference image 104

(see FIG. 2) preferably comprises a reference image that may be used as a basis for comparison with a corresponding recorded image 96 (see FIG. 2).

In one embodiment, the comparing step 18 comprises using a manual comparison 108a (see FIG. 2) to compare the one or more recorded images 96 (see FIG. 2) against the reference image library 103 (see FIG. 2) comprising one or more reference images 104 (see FIG. 2) corresponding to each recorded image 96 (see FIG. 2). In another embodiment, the comparing step 18 comprises using an automated comparison 108b (see FIG. 2) to compare the one or more recorded images 96 (see FIG. 2) against the reference image library 103 (see FIG. 2) comprising one or more reference images 104 (see FIG. 2) corresponding to each recorded image 96 (see FIG. 2). Preferably, the automated comparison 108b (see FIG. 2) is performed with a process control software 90 (see FIG. 2) configured for use in the computer system 80 (see FIG. 2). The process control software 90 (see FIG. 2) preferably has an algorithm 92 (see FIG. 2), such as a process control algorithm, that may be used to issue an alert 114 (see FIG. 2) if the automated comparison 108b (see FIG. 2) of the one or more recorded images 96 (see FIG. 2) against the respective corresponding reference image 104 (see FIG. 2) results in a failure of the one or more recorded images 96 (see FIG. 2) to meet a preselected criteria 116 (see FIG. 2). The computer system 80 (see FIG. 2) and the process control software 90 (see FIG. 2) are discussed in greater detail below.

As shown in FIG. 1A, the method 10 further comprises step 20 of generating a data record 128 (see FIG. 2) of process control data 129 (see FIG. 2) of the manufacturing process 52 (see FIG. 2) performed by the operator 56 (see FIG. 2) on the workpiece 58 (see FIG. 2) in the work area 62 (see FIG. 2).

As shown in FIG. 1A, the method 10 may further comprise optional step 22 of optionally, recording and storing images of the work area 102 (see FIG. 2) at selected points 112 (see FIG. 2) in the manufacturing process 52 (see FIG. 2) for subsequent review and verification.

As shown in FIG. 1B, in another embodiment of the disclosure, there is provided the method 30 for monitoring and verifying a structural bonding process 54 (see FIG. 2) performed by an operator 56 (see FIG. 2) on a workpiece 58 (see FIG. 2) in a work area 62 (see FIG. 2). As shown in FIG. 1B, the method 30 comprises step 32 of positioning one or more vision based cameras 72 (see FIGS. 2, 3) in the work area 62 (see FIG. 2), such that the operator 56 (see FIGS. 2, 3), the work area 62 (see FIGS. 2, 3), and the workpiece 58 (see FIGS. 2, 3) are in a field of view 74 (see FIG. 2) of each of the one or more vision based cameras 72 (see FIG. 2).

As shown in FIG. 1B, the method 30 further comprises step 34 of using a computer system 80 (see FIG. 2) configured for controlling the one or more vision based cameras 72 (see FIG. 2) to record and process the images of the workpiece 98 (see FIG. 2), images of operator actions 100 (see FIG. 2) relating to the structural bonding process 54 (see FIG. 2), and images of the work area 102 (see FIG. 2), all recorded by the one or more vision based cameras 72 (see FIG. 2) during or at completion of each of a plurality of tasks 110 (see FIG. 2) in the structural bonding process 54 (see FIG. 20 to obtain recorded images 96 (see FIG. 2). The step 34 of using the computer system 80 (see FIG. 2) comprises using the computer system 80 further configured for measuring a time period 118 (see FIG. 2) elapsed during performance of each of the plurality of tasks 110 (see FIG. 2) to compare an actual time period 122 (see FIGS. 2, 6) to an expected time period 120 (see FIGS. 2, 6) for completion of each of the plurality of tasks 110 (see FIG. 2) and to issue an alert 114 (see FIG. 2) if the actual time period 122 (see FIGS. 2, 6) does not substantially conform to the expected time period 120 (see FIGS. 2, 6).

The step 34 of using the computer system 80 (see FIG. 2) comprises using the computer system 80 further configured for storing the images of the workpiece 98 (see FIG. 2) upon proper completion of each of the plurality of tasks 110 (see FIG. 2) and for issuing an alert 114 (see FIG. 2) if images of the workpiece 98 (see FIGS. 2, 3) recorded or captured by the one or more vision based cameras 72 (see FIG. 2) at completion of each of the plurality of tasks 110 (see FIG. 2) indicates that each of the plurality of tasks 110 (see FIG. 2) was performed outside of a preselected sequence of tasks 113 (see FIG. 2).

As shown in FIG. 1B, the method 30 further comprises step 36 of storing the one or more recorded images 96 (see FIG. 2) at selected points 112 (see FIG. 2) in the structural bonding process 54 (see FIG. 2) for subsequent review and verification. Step 36 (see FIG. 1B) preferably comprises storing the one or more recorded images 96 (see FIG. 2), such as the images of the workpiece 98 (see FIG. 2), at selected points 112 (see FIG. 2) in the structural bonding process 54 for subsequent review and verification. Step 36 (see FIG. 1B) preferably further comprises storing the one or more recorded images 96 (see FIG. 2), such as images of operator actions 100 (see FIG. 2) relating to the structural bonding process 54 (see FIG. 2), at selected points 112 (see FIG. 1A) in the structural bonding process 54 for subsequent review and verification. Step 36 (see FIG. 1B) preferably further comprises storing the one or more recorded images 96 (see FIG. 2), such as the images of the work area 102, at selected points 112 (see FIG. 2) in the structural bonding process 54 (see FIG. 2) for subsequent review and verification.

The operator 56 (see FIG. 2) must record, document and store each recorded image 96 (see FIG. 2) before the operator 56 (see FIG. 2) will be allowed to proceed to the next step of the manufacturing process 52 (see FIG. 2), such as the structural bonding process 54 (see FIG. 2).

As shown in FIG. 1B, the method 30 further comprises step 38 of comparing one or more of the recorded images 96 (see FIG. 2) against a reference image library 103 (see FIG. 2) comprising one or more reference images 104 (see FIG. 2) corresponding to each recorded image 96 (see FIG. 2) to detect any differences 106 (see FIG. 2) between the recorded image 96 (see FIG. 2) and the respective corresponding reference image 104 (see FIG. 2).

As shown in FIG. 1B, the method 30 further comprises step 40 of generating a data record 128 (see FIG. 2) of process control data 129 (see FIG. 2) of the structural bonding process 54 (see FIG. 2) performed by the operator 56 (see FIG. 2) on the workpiece 58 (see FIG. 2) in the work area 62 (see FIG. 2). The method 10 (see FIG. 1A) preferably includes critical timing information for each process step and compares the actual time period 122 (see FIG. 2) for each step against the expected time period 120 (see FIG. 2) for each step and outputs the data record 128 (see FIG. 2), such as in the form of a process control chart, such as a process times comparison 182 (see FIG. 6) comparing the two, and allowing inspectors to see if any out-of-the-ordinary or out of specification steps occurred.

As shown in FIG. 1B, the method 30 may further comprise optional step 42 of optionally, issuing an alert 114 (see FIG. 2) if comparison 108 (see FIG. 2) of the one or more recorded images 96 (see FIG. 2) against the respective corresponding reference image 104 (see FIG. 2) results in a failure of the one or more recorded images 96 (see FIG. 2) to meet a preselected criteria 116 (see FIG. 2). The issuing the alert step 42 preferably comprises using a process control software 90 (see FIG. 2) configured for use in the computer system 80 (see FIG. 2) and configured to compare the one or more recorded images 96 (see FIG. 2) against the respective corresponding reference image 104 (see FIG. 2), and further configured to issue the alert 114 (see FIG. 2) if comparison 108 (see FIG. 2) of the one or more recorded images 96 (see FIG. 2) results in the failure of the one or more recorded images 96 (see FIG. 2) to meet the preselected criteria 116 (see FIG. 2).

With both the method 10 (see FIG. 1A) and the method 30 (see FIG. 1B), the cameras 70 (see FIGS. 2, 3), such as in the form of vision based cameras 72 (see FIGS. 2, 3), provide a clear and in-depth view of the process operations 55 (see FIG. 2) that are performed. The cameras 70 (see FIGS. 2, 3), such as in the form of vision based cameras 72 (see FIGS. 2, 3), perform real time recording 78 (see FIG. 2) of the workpiece 58 (see FIG. 3), the work area 62 (see FIG. 3), and the actions of the operator 56 (see FIG. 3) relating to the manufacturing process 52 (see FIG. 2), such as the structural bonding process 54 (see FIG. 2). Further, the cameras 70 (see FIGS. 2, 3), such as in the form of vision based cameras 72 (see FIGS. 2, 3), perform a close-up documentation at the selected points 112 (see FIG. 2) of each step of the manufacturing process 52 (see FIG. 2).

In addition, with both the method 10 (see FIG. 1A) and the method 30 (see FIG. 1B), the cameras 70 (see FIGS. 2, 3), such as in the form of vision based cameras 72 (see FIGS. 2, 3), and the computer system 80 (see FIG. 2) enable detailed records of each step to be made, and preferably pinpoint with a recorded image 96 (see FIG. 2) and a time log, the exact step at which a possible error occurred. The method 10 (see FIG. 1A) and the method 30 (see FIG. 1B) also give the operator 56 (see FIG. 3) an opportunity to write comments on each step, if necessary, for example, to explain an out of normal situation or out of specification situation that occurred at a particular step. This may help simplify the inspection review of the manufacturing process 52, such as the structural bonding process 54 (see FIG. 2), and may save time and reduce doubt about possible operator error.

In another embodiment of the disclosure, there is provided a system 50 (see FIG. 2) for monitoring and verifying a manufacturing process 52 (see FIG. 2) performed by an operator 56 (see FIG. 2) on a workpiece 58 (see FIG. 2) in a work area 62 (see FIG. 2). FIG. 2 shows an embodiment of the system 50 of the disclosure. The system 50 provides an optically enhanced in-process system for monitoring and verifying the manufacturing process 52 (see FIG. 2), such as a structural bonding process 54 (see FIG. 2). The system 50 (see FIG. 2) guides the operator 56 (see FIG. 2) through each step of the manufacturing process 52 (see FIG. 2), such as in the form of a structural bonding process 54 (see FIG. 2), thus, increasing the reliability of a structural bond 59 (see FIG. 3).

As shown in FIG. 2, the system 50 may comprise an optical system 50a that uses one or more camera(s) 70, such as one or more vision based camera(s) 72. Alternatively, the system 50 (see FIG. 2) may comprise a sensing system 50b (see FIG. 2) where sensors (not shown) may be used in place of, or in addition to, the one or more cameras 70 (see FIG. 2).

As shown in FIG. 2, the system 50 comprises one or more cameras 70, such as in the form of one or more vision based cameras 72, for example, video cameras 72a (see FIG. 2). As further shown in FIG. 2, the one or more camera(s) 70, such as in the form of one or more vision based camera(s) 72, may be positioned in the work area 62 at one or more location(s) 76 (see also FIG. 3), such that the operator 56 and the workpiece 58 are in a field of view 74 (see also FIG. 3) of each of the one or more vision based cameras 72. Preferably, the one or more vision based cameras 72 (see FIG. 2) each comprises a zoom feature 75 (see FIG. 2) to enable detailed resolution and close-up views of the recorded images 96 (see FIG. 2).

Preferably, the operator 56 (see FIG. 2) and the workpiece 58 (see FIG. 2) are in the field of view 74 (see FIG. 2) of each of the one or more cameras 70 (see FIG. 2), such as in the form of the one or more vision based cameras 72 (see FIG. 2). The one or more cameras 70 (see FIG. 2) are preferably designed to record one or more recorded image(s) 96 (see FIG. 2). As shown in FIG. 2, the recorded image(s) 96 may comprise image(s) of the workpiece 98, image(s) of operator actions 100, and/or images of the work area 102.

As shown in FIG. 2, the system 50 further comprises a computer system 80. The computer system 80 (see FIGS. 2, 3) is preferably positioned in the work area 62 (see FIGS. 2, 3). The computer system 80 (see FIGS. 2, 3) is preferably configured for controlling the one or more vision based cameras 72 (see FIGS. 2, 3) to record and process the images of the workpiece 98 (see FIG. 2) and the images of operator actions 100 (see FIG. 2) relating to the manufacturing process 52 (see FIG. 2), all recorded by the one or more vision based cameras 72 (see FIGS. 2, 3) during or at completion of each of a plurality of tasks 110 (see FIG. 2) in the manufacturing process 52 (see FIG. 2) to obtain recorded images 96 (see FIG. 2). The one or more cameras 70 (see FIG. 2) are preferably controlled by the computer system 80 (see FIG. 2) which guides and monitors, and provides a step-by-step program guidance 130 (see FIGS. 2, 4) and instructions to the operator 56 (see FIG. 2) for creating a structural bond 59 (see FIG. 3).

The system 50 (see FIG. 2) provides a computer system 80 (see FIG. 2) having one or more computer(s) 82 (see FIG. 2). The computer system 80 (see FIG. 2) preferably comprises any of a wide variety of computers 82 (see FIG. 2) now known in the art or that may be developed in the future. By way of example only, the computer 82 (see FIG. 2) may consist of a personal computer, including a desktop computer, a laptop computer, a notebook computer, or another suitable computer. In one embodiment, the computer system 80 (see FIG. 2) comprises one or more computers 82 (see FIG. 2) having a voice recognition control 172 (see FIG. 2) to allow the operator 56 (see FIG. 2) to interact with the computer system 80 (see FIG. 2) via one or more voice commands 174 (see FIG. 2).

As shown in FIG. 2, the computer system 80 preferably further comprises a controller 84 for controlling the computer system 80. The controller 84 may comprise one or more motor controllers, electrical controllers, software control systems, or other suitable controller devices or mechanisms.

As shown in FIG. 2, the computer system 80 preferably further comprises one or more power element(s) 86 or power sources for providing power to the computer system 80. The power element(s) 86 may comprise motors, batteries, electrical power systems, or other suitable power sources.

As shown in FIG. 2, the computer system 80 preferably further comprises one or more connection element(s) 88 for connecting the computer 82 to the controller 84 and/or to the power element 86, or connecting to other suitable components of the computer system 80.

As shown in FIG. 2, the computer system 80 preferably further comprises a process control software 90 that may implement an algorithm 92 designed to be used in conjunction with the one or more computers 82. The algorithm 92 (see FIG. 2) of the process control software 90 (see FIG. 2) may facilitate processing of the recorded images 96 (see FIG. 2). As used herein, "algorithm" means a set of instructions or list of steps for performing a task or solving a problem.

In conjunction with the algorithm 92 (see FIG. 2), such as a machine vision algorithm, the system 50 (see FIG. 2) improves the reliability of bonded structures 218 (see FIG. 7) by verifying that the manufacturing process 52 (see FIG. 2), such as in the form of the structural bonding process 54 (see FIG. 2), was performed in sequence and in an allotted timeframe, and that no foreign object debris (FOD) has contaminated the bond at any stage of the manufacturing process 52 (see FIG. 2), such as in the form of the structural bonding process 54 (see FIG. 2).

It is to be understood that the computer readable process control software 90 (see FIG. 2) disclosed herein may be programmed using any of a wide range of suitable computer readable programming languages that are now known in the art or that may be developed in the future. Preferably, the computer readable programming language comprising the computer readable process control software 90 (see FIG. 2) and the algorithm 92 (see FIG. 2) are a cross-platform compatible computer language. For example, an exemplary process control software 90 (see FIG. 2) that may be used includes LABVIEW (Laboratory Virtual Instrument Engineering Workbench) from National Instruments Corporation of Austin, Tex. (LABVIEW is a registered trademark of National Instruments Corporation of Austin, Tex.)

It is also to be understood that the computer readable process control software 90 (see FIG. 2) disclosed herein may include one or more functions, routines, subfunctions, and subroutines, and need not be combined in a single package but may instead be embodied in separate components. In addition, the computer readable process control software 90 (see FIG. 2) may be a stand-alone application, or may be a plug-in module for an existing application and/or operating system. Alternatively, the computer readable process control software 90 (see FIG. 2) may be integrated into an application or operating system. In yet another embodiment, the computer readable process control software 90 (see FIG. 2) may reside at one or more network devices (not shown), such as an administrator terminal, a server, or another suitable As shown in FIG. 2, the computer system 80 preferably further comprises one or more data storage device(s) 94. The one or more data storage device(s) 94 (see FIG. 2) may comprise computer readable storage media for storing such items as the process control data 129 (see FIG. 2), the algorithm 92 (see FIG. 2), the process control software 90 (see FIG. 2), another computer readable software program or code, or other suitable items. The data storage devices 94 (see FIG. 2) may comprise any suitable computer readable storage media, such as read only memory (ROM), random access memory (RAM), video memory (VRAM), hard disk, floppy diskette, compact disc (CD), magnetic tape, a combination thereof, or another suitable computer readable storage device.

As shown in FIG. 2, the computer system 80 may further comprise one or more computer vision monitors 95. The computer system 80 (see FIG. 2) may incorporate in-process control measurements 124 (see FIG. 2) using the one or more computer vision monitors 95 (see FIG. 2).

The computer system 80 (see FIG. 2) may preferably additionally include various other components and features known in the art, such as a central processing unit (CPU), system memory, an operating system, a plurality of applications, one or more input/output interfaces(s) that interface with corresponding input/output device(s), one or more communications interface(s) that may interface with other computer system(s) or computer networks, a printing device such as a printer or other suitable output device for displaying or outputting the recorded images and the reference images, keyboards, or other suitable components.

As shown in FIG. 2, the system 50 further comprises a reference image library 103 (see FIG. 2) comprising one or more reference image(s) 104 corresponding to each recorded image 96 to detect any differences 106 between the recorded image 96 and the respective corresponding reference image 104. In one embodiment, the recorded images 96 (see FIG. 2) are preferably compared against the reference image library 103 (see FIG. 2) comprising the one or more reference images 104 (see FIG. 2) corresponding to each recorded image 96 (see FIG. 2) via a manual comparison 108a (see FIG. 2). In another embodiment, the recorded images 96 (see FIG. 2) are compared against the reference image library 103 (see FIG. 2) comprising the one or more reference images 104 (see FIG. 2) corresponding to each recorded image 96 (see FIG. 2) via an automated comparison 108b (see FIG. 2) with the process control software 90 (see FIG. 2) configured for use in the computer system 80 (see FIG. 2). As shown in FIG. 2, the system 50 may further comprise an alert 114 for alerting the operator 56 if the automated comparison 108b of the recorded image 96 against the respective corresponding reference image 104 results in a failure of the recorded image 96 to meet a preselected criteria 116.

As shown in FIG. 2, the system 50 further comprises a data record 128 of process control data 129 of the manufacturing process 52, such as a structural bonding process 54, performed by the operator 56 on the workpiece 58 in the work area 62. The process control data 129 in the data record 128 may comprise such information or data, including but not limited to, process time(s) 119 (see FIG. 2) of the manufacturing process 52 (see FIG. 2) performed by the operator 56 (see FIG. 2) on the workpiece 58 (see FIG. 2) in the work area 62 (see FIG. 2); results of the comparison 108 (see FIG. 2) between the recorded images 96 (see FIG. 2) and the reference images 104 (see FIG. 2) for subsequent review and/or verification; confirmation of the plurality of tasks 110 (see FIG. 2) that are completed in the manufacturing process 52; confirmation of any out of specification or out of the ordinary conditions in the manufacturing process 52; correction of any out of specification or out of the ordinary conditions in the manufacturing process 52; data links to the reference images 104 (see FIG. 2) and/or the recorded images 96 (see FIG. 2); process control charts or graphs (e.g., data record graph 180 (see FIG. 6)); recording or documenting of any in-process control measurements 124 (see FIG. 2); and any other quality data, quality measurements, or process control measurement data the operator 56 (see FIG. 2) takes during the manufacturing process 52 (see FIG. 2).

A data record 128 (see FIG. 2) that is generated preferably flags any suspicious activities which may be reviewed through the recorded images 96 (see FIG. 2) and video recording(s) taken by the one or more cameras 70 (see FIG. 2) of the system 50 (see FIG. 2). For example, the system 50 (see FIG. 2) may check for the presence of gloves and correct solvents used, and then may record or capture these process operations 55 (see FIG. 2) in recorded images 96 (see FIG. 2) for review and verification later, if necessary. The system 50 (see FIG. 2) also documents a recorded image 96 (see FIG. 2) at the completion of each step as evidence that the step was completed and completed correctly. The actual time period 122 (see FIG. 20 for each step is logged and checked against an expected time period 120 (see FIG. 2) or target time period for each step. This allows inspectors to see if any interruptions happened during the manufacturing process 52 (see FIG. 2), such as in the form of the structural bonding process 54 (see FIG. 2), and the program will flag or may issue an alert 114 (see FIG. 2) of any out of tolerance or out of specification steps at the end for review and verification, if needed. The verification that the structural bond 59 (see FIG. 3) was formed exactly according to the preselected criteria 116 (see FIG. 2) and preselected sequence of tasks 113 (see FIG. 2) and was not contaminated by foreign object debris (FOD) or other contaminants may confirm the quality of the structural bond 59 (see FIG. 3) and may give greater confidence in its certification.

In-process control measurements 124 (see FIG. 2) provide the data record 128 (see FIG. 2) for process control documentation and statistical process control. The preselected criteria 116 (see FIG. 2) and preselected sequence of tasks 113 (see FIG. 2), such as control charts, provide a mechanism to monitor and set criteria for the structural bond 59 (see FIG. 3) quality. The system 50 provides for quantitative measurement and consistent recording of process control data 129 (see FIG. 2), resulting in the data record 128 (see FIG. 2). In addition, the system 50, provides an optically enhanced bonding work station 64 (see FIG. 3) for performing the critical steps that are important for primary reliability of the structural bond 59 (see FIG. 3). Optical, laser, and other non-contact measurements may monitor activities in a bonding operation providing a way to auto-interpret the activities such as mixing, surface preparation, out time of the adhesive, placement, movement of the adherends, start of cure and end of cure, and to detect anomalous product conditions and measure alignment characteristics.

FIG. 3 is an illustration of a work room 61 and an operator 56 using an embodiment of a system 50 (see FIG. 2) of the disclosure. FIG. 3 shows an exemplary configuration of the work room 61 that may be used in the method 10 (see FIG. 1A), the method 30 (see FIG. 1B), and with the system 50 (see FIG. 2).

As shown in FIG. 3, the work room 61 comprises a work area 62. The work area 62 preferably comprises a work station 64 and a work table 66. As further shown in FIG. 3, one or more cameras 70 are positioned at one or more locations 76 within the work room 61. Preferably, the one or more cameras 70 (see FIG. 3) comprise vision based cameras 72 (see FIG. 3) each having a field of view 74 (see FIG. 3). More preferably, the one or more cameras 70 (see FIG. 3) comprise one or more vision based cameras 72 (see FIG. 3), such as video cameras 72a (see FIG. 2). The vision based cameras 72 (see FIG. 2) may comprise a process observation camera 70a (see FIG. 2) and/or a query camera 70b (see FIG. 2). The vision based cameras 72 (see FIG. 2) preferably perform real time recording 78 (see FIG. 2) and take real time optical measurements 79 (see FIG. 2) to obtain one or more recorded image(s) 96 (see FIG. 2), such as image(s) of the workpiece 98 (see FIG. 2), image(s) of operator actions 100 (see FIG. 2), and image(s) of the work area 102 (see FIG. 2).

The vision based cameras 72 (see FIG. 3) may be used in the work room 61 (see FIG. 3) to observe the process operations 55 (see FIG. 2). While FIG. 3 shows the cameras 70 as vision based cameras 72, such as optical cameras, the method 10 (see FIG. 1A), the method (see FIG. 1B), and the system 50 (see FIG. 2) may alternatively use a sensing system 50b (see FIG. 2) such as stand-off sensing systems. The work station 64 (see FIG. 3) preferably has the computer system 80 (see FIG. 3) to provide a step-by-step program guidance 130 (see FIGS. 2, 4) to the operator 54 (see FIG. 3), and where possible, the monitoring systems keep and maintain a data record 128 (see FIG. 2).

As shown in FIG. 3, the operator 56 is positioned at the work table 66. The workpiece 58 is shown positioned on the surface 68 of the work table 66. Preferably, the workpiece 58 (see FIG. 3) comprises two or more component parts 60 (see FIG. 3) that are bonded together, such as at a structural bond 59 (see FIG. 3). As further shown in FIG. 3, one camera 70, such as a vision based camera 72, is positioned directly in front of the operator 56 and the workpiece 58, to view and record the operator 56 performing the manufacturing process 52 (see FIG. 2) on the workpiece 58. As further shown in FIG. 3, additional cameras 70, such as vision based cameras 72, may be positioned to the side and behind the workpiece 58 and the operator 56 and behind the work station 64. The work station 64 may comprise a computer 82 (see FIG. 3) that provides the step-by-step program guidance 130 (see FIGS. 2, 4) to the operator 56.

Figure 4:
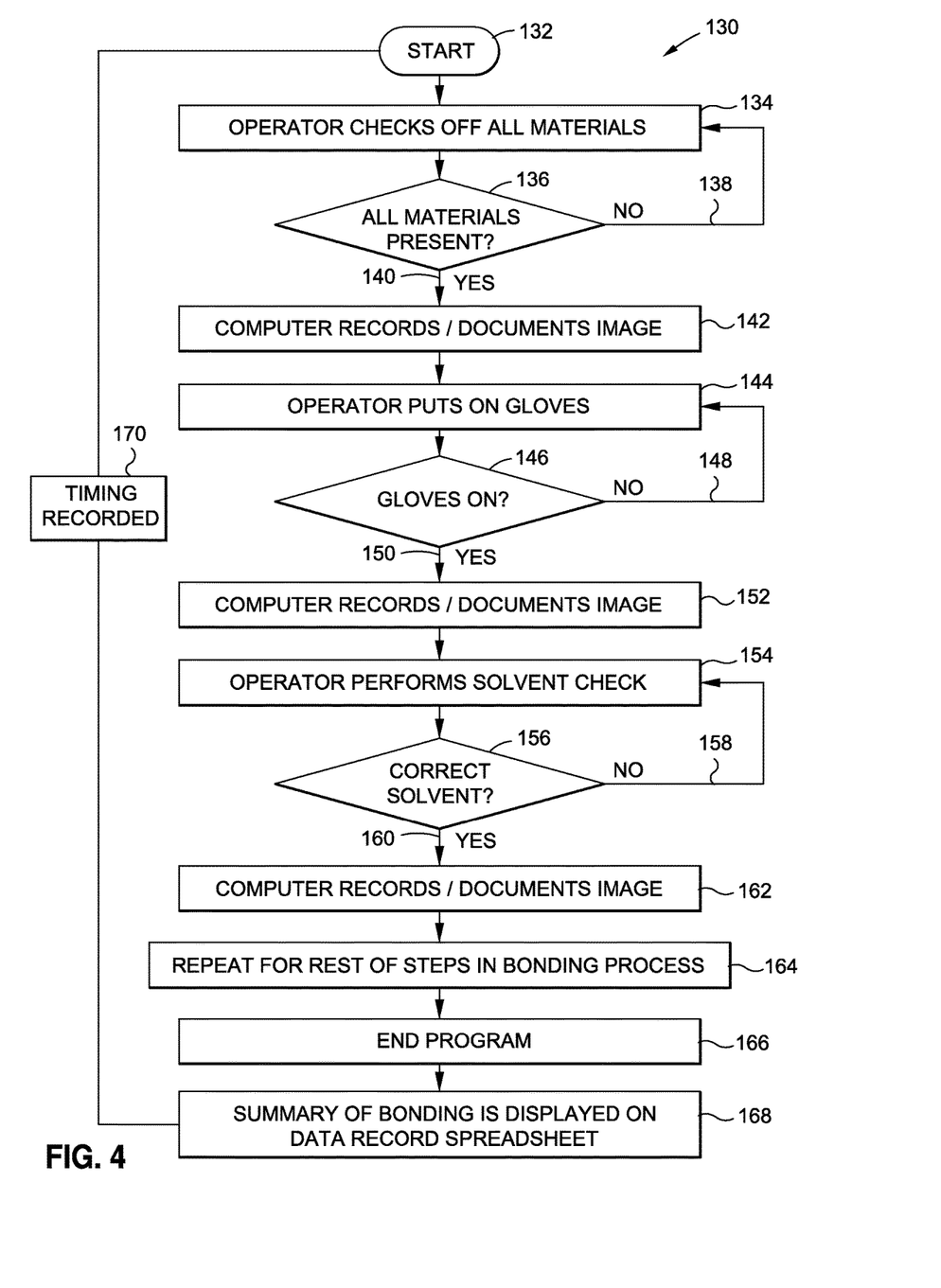
FIG. 4 is an illustration of a process flow diagram showing an embodiment of a step-by-step program guidance of the disclosure.

FIG. 4 is an illustration of a process flow diagram showing an embodiment of an exemplary step-by-step program guidance 130 of the disclosure. The computer system 80 (see FIG. 2) of the system 50 (see FIG. 2) may comprise the step-by-step program guidance 130 (see FIGS. 2, 4) configured to provide step-by-step instructions 131 (see FIG. 2) to the operator 56 (see FIG. 2) to perform the manufacturing process 52 (see FIG. 2) on the workpiece 58 (see FIG. 2) in the work area 62 (see FIG. 2).

As shown in FIG. 4, the step-by-step program guidance 130 may comprise an initial command 132 to "Start" the method 10, the method 30, and/or the system 50. The step-by-step program guidance 130 may further comprise an instruction command 134 to the operator 56 (see FIG. 3), such as instructing the operator 56 (see FIG. 3) to check off all materials 69 (see FIG. 2).

As further shown in FIG. 4, the step-by-step program guidance 130 may further comprise a computer query 136, such as a query asking if all materials 69 (see FIG. 2) are present. If the answer is a "No" answer 138, the instruction command 134 to check off all materials 69 is repeated. If the answer is a "Yes" answer 140, the computer 82 (see FIG. 2) performs a record image step 142, such as the computer 82 (see FIG. 2) records and/or documents the recorded image 96 (see FIG. 2).

As further shown in FIG. 4, the step-by-step program guidance 130 may further comprise an instruction command 144 to the operator 56 (see FIG. 3), such as instructing the operator 56 (see FIG. 3) to put on gloves (not shown). As further shown in FIG. 4, the step-by-step program guidance 130 may further comprise a computer query 146, such as a query asking if the operator's gloves are on. If the answer is a "No" answer 148, the instruction command 144 to put the gloves on is repeated. If the answer is a "Yes" answer 150, the computer 82 (see FIG. 2) performs a record image step 152, such as the computer 82 (see FIG. 2) records and/or documents the recorded image 96 (see FIG. 2).

As further shown in FIG. 4, the step-by-step program guidance 130 may further comprise an instruction command 154 to the operator 56 (see FIG. 3), such as instructing the operator 56 (see FIG. 3) to perform a solvent (not shown) check. As further shown in FIG. 4, the step-by-step program guidance 130 may further comprise a computer query 156, such as a query asking if the solvent is correct. If the answer is a "No" answer 158, the instruction command 154 to perform a solvent check is repeated. If the answer is a "Yes" answer 160, the computer 82 (see FIG. 2) performs a record image step 162, such as the computer 82 (see FIG. 2) records and/or documents the recorded image 96 (see FIG. 2).

As shown in FIG. 4, the step-by-step program guidance 130 may further comprise a repeat command 164 for the rest of the steps in the manufacturing process 52 (see FIG. 2), such as the structural bonding process 54. As further shown in FIG. 4, the step-by-step program guidance 130 may further comprise an end command 166, such as to end the computer program. As shown in FIG. 4, the step-by-step program guidance 130 may further comprise a data display step 168, such as a summary of bonding is displayed for the data record 128 (see FIG. 2) on a data record spreadsheet. FIG. 4 further shows a timing recorded operation 170 during the step-by-step program guidance 130

FIG. 5A is an illustration of a reference image 104 or reference images used in embodiments of the system 50 (see FIG. 2) and the method 10 (see FIG. 1A) or the method 30 (see FIG. 1B) of the disclosure. As shown in FIG. 5A, the operator 56 and the workpiece 58, such as comprising component parts 60, are in the field of view 74 of the camera 70. The workpiece 58 and the materials 69 are on the work table 66. The computer 82 of the computer system 80 is also on the work table 66. The camera 70 (see FIG. 5A) records the reference image 104 (see FIG. 5A) which is based on a preselected criteria 116 (see FIG. 2).

FIG. 5B is an illustration of a real time recording 78 by the camera 70 used in embodiments of the system 50 (see FIG. 2) and the method 10 (see FIG. 1A) or the method 30 (see FIG. 1B) of the disclosure. As shown in FIG. 5B, the operator 56 and the workpiece 58, such as comprising component parts 60, are in the field of view 74 of the camera 70. The workpiece 58 and the materials 69 are on the work table 66. The computer 82 of the computer system 80 is also on the work table 66. The camera 70 (see FIG. 5B) performs real time recording 78 (see FIG. 5B) of the workpiece 58 (see FIG. 5B) and the actions of the operator 56 (see FIG. 5B) performing process operations 55 (see FIG. 2) on the workpiece 58 (see FIG. 5B).

FIG. 5C is an illustration of a recorded image 96 used in embodiments of the system 50 (see FIG. 2) and the method 10 (see FIG. 1A) or the method 30 (see FIG. 1B) of the disclosure. As shown in FIG. 5C, the operator 56 and the workpiece 58, such as comprising component parts 60, are in the field of view 74 of the camera 70. The workpiece 58 and materials 69 are on the work table 66. The computer 82 of the computer system 80 is also on the work table 66. Once the operator 56 has performed a process operation 55 to the operator's satisfaction, the operator 56 may instruct or cause the camera 70 (see FIG. 5C) to record and document the recorded image 96 (see FIG. 5C).

Figure 6:
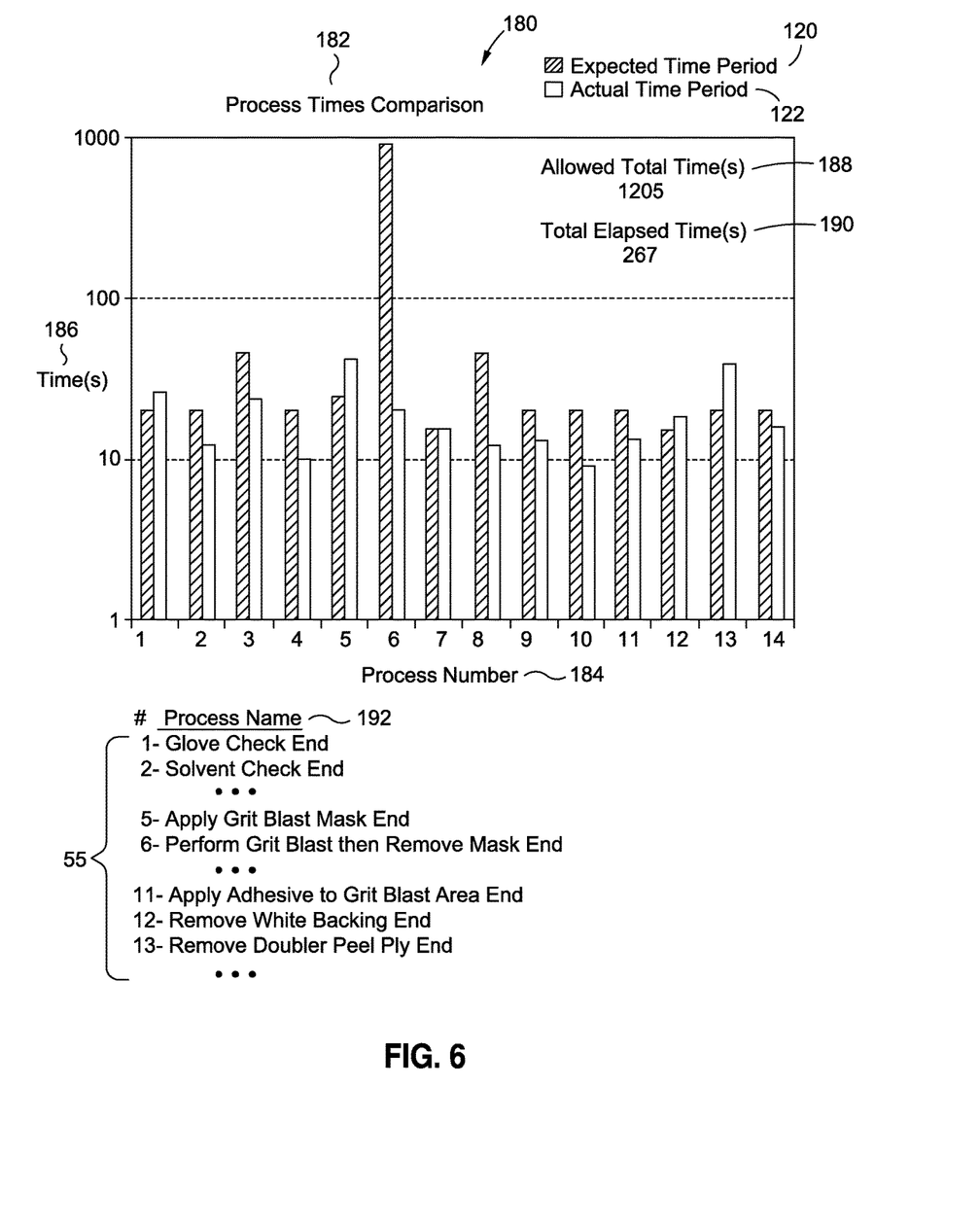
FIG. 6 is an illustration of a data record graph of process times comparison of process operations of an embodiment of a method of the disclosure.

FIG. 6 is an illustration of a data record graph 180 of process times comparison 182 of process operations 55 of an embodiment of a method 10 (see FIG. 1A) or a method 30 (see FIG. 1B) of the disclosure. At the end of the manufacturing process 52, such as the structural bonding process 54, the computer 82 (see FIG. 2) of the computer system 80 (see FIG. 2) generates a data record 128 (see FIG. 2) of process control data 129 (see FIG. 2) (e.g., process times 119 (see FIG. 2)), such as in the form of a data record spreadsheet, of the manufacturing process 52 (see FIG. 2), such as the structural bonding process 54 (see FIG. 2). In particular, the data record graph 180 of FIG. 6 shows process times comparison 182 between the expected time period 120 and the actual time period 122 spent on each of the process operations 55. As shown in FIG. 6, the data record graph 180 shows the process number 184 of the process operations 55 along the x-axis versus time 186 in seconds (s) along the y-axis.

FIG. 6 further shows the expected time period 120 and the actual time period 122 of fourteen (14) various process operations 55 performed by the operator 56 (see FIG. 2). FIG. 6 further shows some exemplary timed and recorded process operations 55 by process name 192 corresponding to seven (7) of the fourteen (14) process numbers 184, such as, including but not limited to: Process Number 1—Glove Check End; Process Number 2—Solvent Check End; Process Number 5—Apply Grit Blast Mask End; Process Number 6—Perform Grit Blast then Remove Mask End; Process Number 11—Apply Adhesive to Grit Blast Area End; Process Number 12—Remove White Backing End; and Process Number 13—Remove Doubler Peel Ply End. FIG. 6 shows that the allowed total time 188 measured in seconds was 1205 seconds, and the total elapsed time 190 measured in seconds was 267 seconds.

Figure 7:
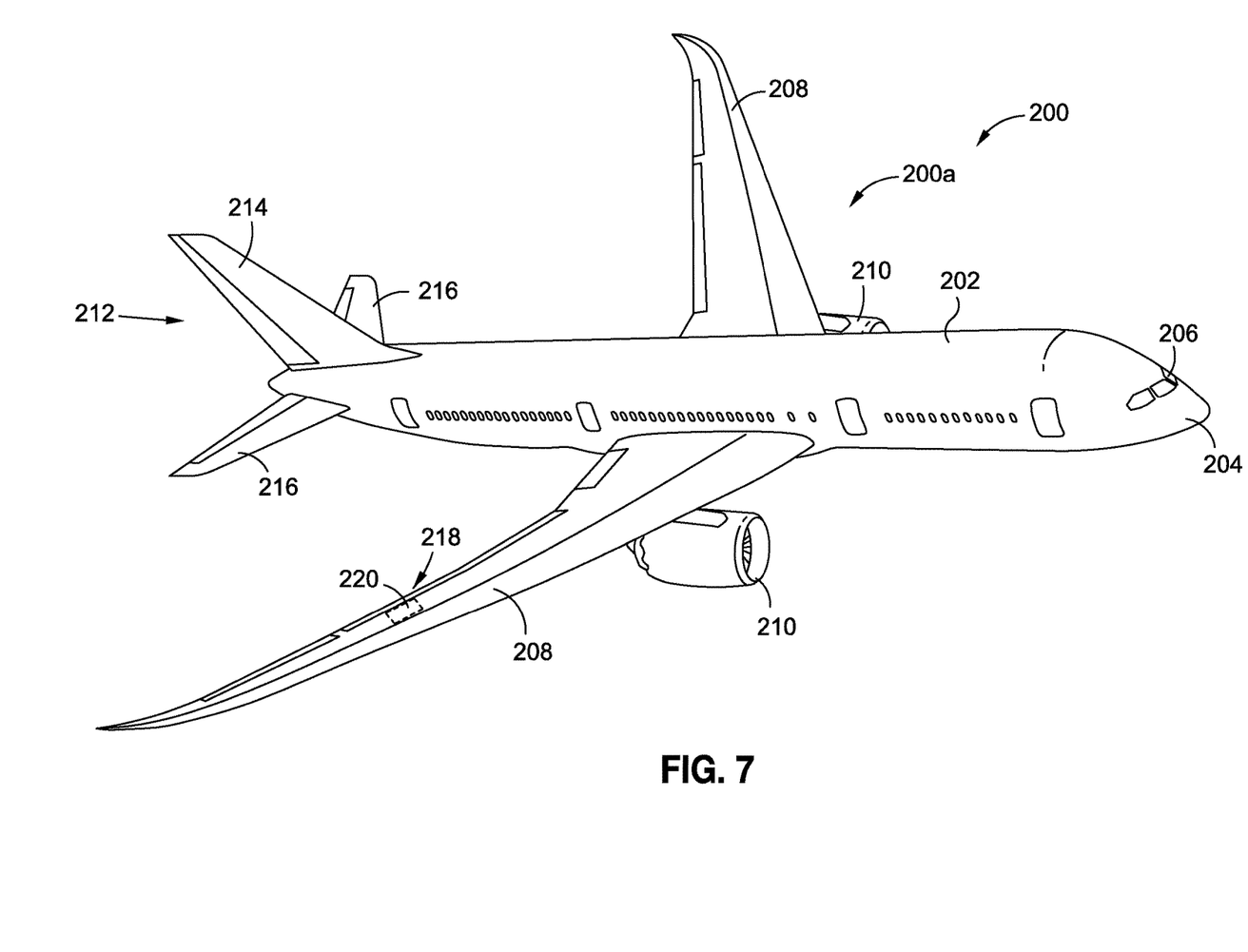
FIG. 7 is an illustration of a perspective view of an aircraft having one or more structures that may undergo a manufacturing process performed and recorded using embodiments of a system and a method of the disclosure.
Figure 8:
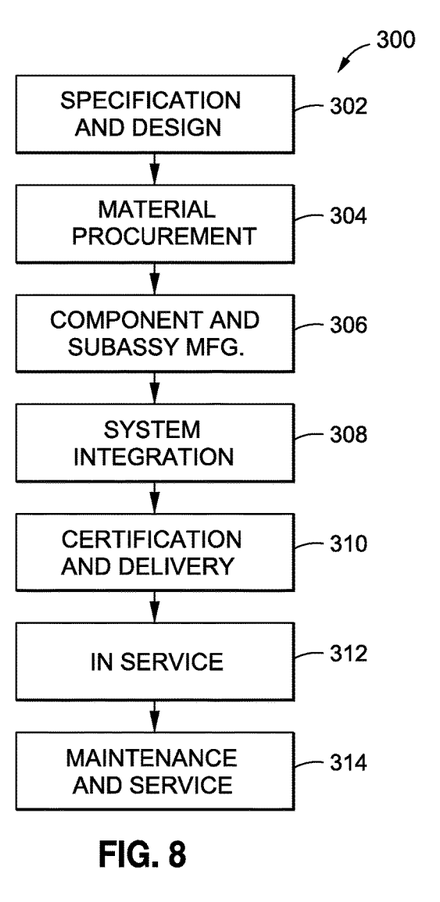
FIG. 8 is an illustration of a flow diagram of an aircraft manufacturing and service method; and, FIG. 9 is an illustration of a functional block diagram of an embodiment of an aircraft of the disclosure.

FIG. 7 is an illustration of a perspective view of an air vehicle 200, such as in the form of an aircraft 200a, having one or more structures 218, such as in the form of a wing panel 220, that may undergo a manufacturing process 52 (see FIG. 2), such as a structural bonding process 54 (see FIG. 2), performed and recorded using embodiments of the system 50 (see FIG. 2) and the method 10 (see FIG. 1A) or the method 30 (see FIG. 1B) of the disclosure. As shown in FIG. 8, the air vehicle 200, such as in the form of aircraft 200a may comprise a fuselage 202, a nose 204, a cockpit 206, wings 208, propulsion units 210, and a tail 212 comprising a vertical stabilizer 214 and horizontal stabilizers 216.

Figure 9:
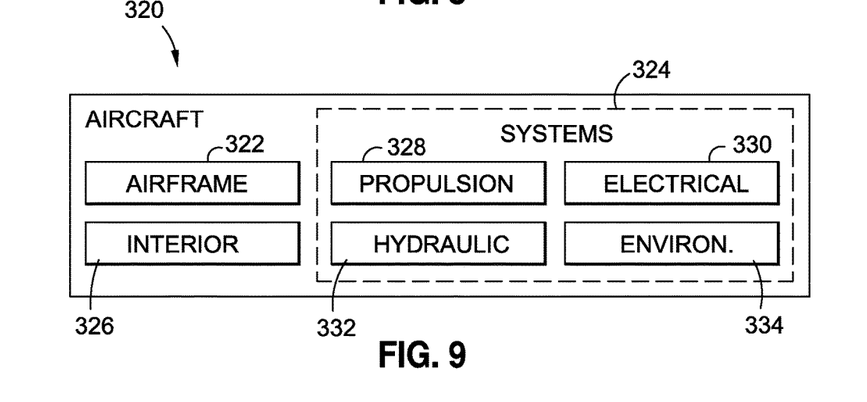

FIG. 8 is an illustration of a flow diagram of an aircraft manufacturing and service method 300. FIG. 9 is an illustration of a block diagram of an aircraft 320. Referring to FIGS. 8-9, embodiments of the disclosure may be described in the context of the aircraft manufacturing and service method 300, as shown in FIG. 8, and the aircraft 320, as shown in FIG. 9. During pre-production, exemplary aircraft manufacturing and service method 300 may include specification and design 302 of the aircraft 320 and material procurement 304. During production, component and subassembly manufacturing 306 and system integration 308 of the aircraft 320 takes place. Thereafter, the aircraft 320 may go through certification and delivery 310 in order to be placed in service 312. While in service 312 by a customer, the aircraft 320 may be scheduled for routine maintenance and service 314 which may also include modification, reconfiguration, refurbishment, and other suitable services.

Each of the processes of the aircraft manufacturing and service method 300 may be performed or carried out by a system integrator, a third party and/or a customer. For the purposes of this description, a system integrator may include without limitation any number of aircraft manufacturers and major-system subcontractors; a third party may include without limitation any number of vendors, subcontractors and suppliers; and, a customer may be an airline, leasing company, military entity, service organization and other suitable customers.

As shown in FIG. 9, the aircraft 320 produced by exemplary aircraft manufacturing and service method 300 may include an airframe 322 with a plurality of high-level systems 324 and an interior 326. Examples of the plurality of high-level systems 324 may include one or more of a propulsion system 328, an electrical system 330, a hydraulic system 332, and an environmental system 334. Any number of other systems may also be included. Although an aerospace example is shown, the principles of the invention may be applied to other industries, such as the automotive industry.

Methods and systems embodied herein may be employed during any one or more of the stages of the aircraft manufacturing and service method 300. For example, components or subassemblies corresponding to component and subassembly manufacturing 306 may be fabricated or manufactured in a manner similar to components or subassemblies produced while the aircraft 320 is in service 312. Also, one or more apparatus embodiments, method embodiments, or a combination thereof, may be utilized during component and subassembly manufacturing 306 and system integration 308, for example, by substantially expediting assembly of or reducing the cost of the aircraft 320. Similarly, one or more of apparatus embodiments, method embodiments, or a combination thereof, may be utilized while the aircraft 320 is in service 312, for example and without limitation, to routine maintenance and service 314.

Disclosed embodiments of the method 10 (see FIG. 1A), the method 30 (see FIG. 1B), and the system 50 (see FIG. 2) are designed for process control and documentation of a manufacturing process 52 (see FIG. 2), such as a structural bonding process 54 (see FIG. 2), e.g., structural bond repair. In addition, disclosed embodiments of the method 10 (see FIG. 1A), the method 30 (see FIG. 1B), and the system 50 (see FIG. 2) use one or more or multiple cameras 70 (see FIG. 2), such as vision based cameras 72 (see FIG. 2), coupled with a computer system 80 (see FIG. 2) that preferably provides a step-by-step program guidance 130 (see FIG. 4) and process operations verification 126 (see FIG. 2). The computer assisted method 10, method 30, and system 50 use real time optical measurements 79 (see FIG. 2) to provide a means to carefully define steps and allow a process control software 90 (see FIG. 2) with an algorithm 92 (see FIG. 2) to document and record any unexpected, out of sequence, out or specification, or time extended activities that may be needed to be reviewed. This may, in turn, satisfy the Federal Aviation Administration's (FAA) strict in-process control requirements.

Disclosed embodiments of the method 10 (see FIG. 1A), the method 30 (see FIG. 1B), and the system 50 (see FIG. 2) provide for a work station 64 (see FIG. 3), such as an optically enhanced bonding work station, developed as a means to improve the reliability of the manufacturing process 52 (see FIG. 2), such as the structural bonding process 54 (see FIG. 2). Further, disclosed embodiments of the method 10 (see FIG. 1A), the method 30 (see FIG. 1B), and the system 50 (see FIG. 2) may reduce the risk of a weak bond creation by incorporating in-process control measurements 124 (see FIG. 2) using one or more computer vision monitors 95 (see FIG. 2).

Moreover, disclosed embodiments of the method 10 (see FIG. 1A), the method 30 (see FIG. 1B), and the system 50 (see FIG. 2) provide for an optically enhanced method and system that automatically record and document the steps of the process operations 55 (see FIG. 2) and allow quality assurance reviewers to know exactly how a structural bond 59 (see FIG. 3) between component parts 60 (see FIGS. 2, 3) is formed. With the step-by-step program guidance 130 (see FIG. 4), the quality and reliability of the structural bond 59 (see FIG. 3) may be improved by ensuring that all steps of the process operations 55 (see FIG. 2) are performed in the same sequence by the operator 56 (see FIG. 3). Further, the step-by-step program guidance 130 (see FIG. 4) facilitates training and process improvement by providing the ability to review each step of the process operations 55 (see FIG. 2) of the method 10 (see FIG. 1A) and method 30 (see FIG. 1B). Thus, the overall manufacturing costs may be decreased and the reliability of the manufacturing process may be improved. In addition, disclosed embodiments of the method 10 (see FIG. 1A), the method 30 (see FIG. 1B), and the system 50 (see FIG. 2) facilitate standardization and uniformity and eliminate or minimize variations in the manufacturing process 52 (see FIG. 2), such as the structural bonding process 54 (see FIG. 2). By requiring all operators 56 (see FIG. 2) to follow the same process operations 55 (see FIG. 2), in the same order, reliability and quality of the manufacturing process 52 (see FIG. 2), such as the structural bonding process 54 (see FIG. 2) may be improved, as compared to known processes that do not use embodiments of the method 10 (see FIG. 1A), the method 30 (see FIG. 1B), and the system 50 (see FIG. 2) disclosed herein.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A method for monitoring and verifying a manufacturing process performed by an operator on a workpiece in a work area, the method comprising the steps of:
    positioning one or more cameras in the work area, such that the operator and the workpiece are in a field of view of each of the one or more cameras;
    using a computer system configured for controlling the one or more cameras to record and process images of the workpiece and images of operator actions relating to the manufacturing process, all recorded by the one or more cameras during or at completion of each of a plurality of tasks in the manufacturing process to obtain recorded images, the operator actions including performing structural bonding process operations on the workpiece;
    storing the one or more recorded images at selected points in the manufacturing process for subsequent review and verification, the operator recording, documenting, and storing each of the one or more recorded images before the operator is allowed to proceed to a next step of the manufacturing process;
    comparing one or more of the recorded images against a reference image library comprising one or more reference images corresponding to each recorded image to detect any differences between the recorded image and the respective corresponding reference image; and,
    generating a data record of process control data of the manufacturing process performed by the operator on the workpiece in the work area.

2. The method of claim 1, further comprising the step of recording and storing images of the work area at selected points in the manufacturing process for subsequent review and verification.

3. The method of claim 1, wherein the step of using the computer system configured for controlling the one or more cameras comprises using a computer system having a voice recognition control to allow the operator to interact with the computer system via voice commands.

4. The method of claim 1, wherein the method for monitoring and verifying the manufacturing process comprises monitoring and verifying a structural bonding process.

5. The method of claim 1, wherein the comparing step comprises using a manual comparison to compare the one or more recorded images against the reference image library comprising the one or more reference images corresponding to each recorded image.

6. The method of claim 1, wherein the comparing step comprises using an automated comparison to compare the one or more recorded images against the reference image library comprising the one or more reference images corresponding to each recorded image, the automated comparison performed with a process control software configured for use in the computer system.

7. The method of claim 6, further comprising the step of using the process control software to issue an alert if the automated comparison of the one or more recorded images against the respective corresponding reference image results in a failure of the one or more recorded images to meet a preselected criteria.

8. The method of claim 1, wherein the step of using the computer system comprises using the computer system further configured for measuring an actual time period elapsed during performance of each of the plurality of tasks to compare the actual time period to an expected time period for completion of each of the plurality of tasks, and to issue an alert if the actual time period does not substantially conform to the expected time period.

9. The method of claim 1, wherein the step of using the computer system comprises using the computer system further configured for storing images of the workpiece upon proper completion of each of the plurality of tasks and for issuing an alert if recorded images of the workpiece recorded by the one or more cameras at completion of each of the plurality of tasks indicates that each of the plurality of tasks was performed outside of a preselected sequence of tasks.

10. A method for monitoring and verifying a structural bonding process performed by an operator on a workpiece in a work area, the method comprising the steps of:
    positioning one or more vision based cameras in the work area, such that the operator, the work area, and the workpiece are in a field of view of each of the one or more vision based cameras;
    using a computer system configured for controlling the one or more vision based cameras to record and process images of the workpiece, images of operator actions relating to the structural bonding process, and images of the work area, all recorded by the one or more vision based cameras during or at completion of each of a plurality of tasks in the structural bonding process to obtain recorded images, the operator actions including performing structural bonding process operations on the workpiece;
    storing the one or more recorded images at selected points in the structural bonding process for subsequent review and verification, the operator recording, documenting, and storing each of the one or more recorded images before the operator is allowed to proceed to a next step of the manufacturing process;
    comparing one or more of the recorded images against a reference image library comprising one or more reference images corresponding to each recorded image to detect any differences between the recorded image and the respective corresponding reference image; and,
    generating a data record of process control data of the structural bonding process performed by the operator on the workpiece in the work area.

11. The method of claim 10, further comprising issuing an alert if comparison of the one or more recorded images against the respective corresponding reference image results in a failure of the one or more recorded images to meet a preselected criteria.

12. The method of claim 11, wherein the issuing the alert step comprises using a process control software configured for use in the computer system and configured to compare the one or more recorded images against the respective corresponding reference image, and further configured to issue the alert if comparison of the one or more recorded images results in the failure of the one or more recorded images to meet the preselected criteria.

13. The method of claim 10, wherein the step of using the computer system comprises using the computer system further configured for measuring an actual time period elapsed during performance of each of the plurality of tasks to compare the actual time period to an expected time period for completion of each of the plurality of tasks and to issue an alert if the actual time period does not substantially conform to the expected time period.

14. The method of claim 10, wherein the step of using the computer system comprises using the computer system further configured for storing images of the workpiece upon proper completion of each of the plurality of tasks and for issuing an alert if images of the workpiece captured by the one or more vision based cameras at completion of each of the plurality of tasks indicates that each of the plurality of tasks was performed outside of a preselected sequence of tasks.

15. A system for monitoring and verifying a manufacturing process performed by an operator on a workpiece in a work area, the system comprising:
    one or more vision based cameras positioned in the work area, such that the operator and the workpiece are in a field of view of each of the one or more vision based cameras;
    a computer system positioned in the work area and configured for controlling the one or more vision based cameras to record and process images of the workpiece and images of operator actions relating to the manufacturing process, all recorded by the one or more vision based cameras during or at completion of each of a plurality of tasks in the manufacturing process to obtain recorded images, the operator actions including performing structural bonding process operations on the workpiece, and the operator recording, documenting, and storing each of the recorded images before the operator is allowed to proceed to a next step of the manufacturing process;
    a reference image library comprising one or more reference images corresponding to each recorded image to detect any differences between the recorded image and the respective corresponding reference image; and,
    a data record of process control data of the manufacturing process performed by the operator on the workpiece in the work area.

16. The system of claim 15, wherein the recorded images further comprise images of the work area recorded and stored at selected points in the manufacturing process for subsequent review and verification.

17. The system of claim 15, wherein the manufacturing process is a structural bonding process.

18. The system of claim 15, wherein the recorded images are compared against the reference image library comprising the one or more reference images corresponding to each recorded image via a manual comparison.

19. The system of claim 15, wherein the recorded images are compared against the reference image library comprising the one or more reference images corresponding to each recorded image via an automated comparison with a process control software configured for use in the computer system.

20. The system of claim 19, further comprising an alert for alerting the operator if the automated comparison of the recorded image against the respective corresponding reference image results in a failure of the recorded image to meet a preselected criteria.

21. The system of claim 15, wherein the one or more vision based cameras comprise video cameras.

22. The system of claim 15, wherein the one or more vision based cameras comprise a zoom feature to enable detailed resolution of the recorded images.

23. The system of claim 15, wherein the computer system comprises one or more computers having a voice recognition control to allow the operator to interact with the computer system via voice commands.

24. The system of claim 15, wherein the computer system comprises a step-by-step program guidance configured to provide step-by-step instructions to the operator to perform the manufacturing process on the workpiece in the work area.

* * * * *